United States Patent [19]
Beutel et al.

[11] Patent Number: 5,145,743
[45] Date of Patent: Sep. 8, 1992

[54] X-RAY INTENSIFYING SCREENS WITH IMPROVED SHARPNESS

[75] Inventors: Jacob Beutel, Hockessin, Del.; Lothar H. Brixner, West Chester, Pa.

[73] Assignee: E. I. Du Pont de Nemours and Company, Wilmington, Del.

[21] Appl. No.: 603,276

[22] Filed: Oct. 25, 1990

[51] Int. Cl.$^5$ ............................................. B32B 5/16
[52] U.S. Cl. ............................... 428/403; 428/328; 428/407; 428/690; 428/691; 427/158; 427/214; 427/215; 430/7; 430/139; 430/966; 250/483.1; 250/486.1; 250/488.1; 252/301.4 R; 252/301.4 S; 252/301.4 H
[58] Field of Search ............... 428/323, 329, 402, 407, 428/690, 691, 913, 917, 403, 328; 427/35, 157, 158, 214, 215; 430/6, 7, 139, 495, 567, 603, 604, 966; 378/98, 174; 250/483.1, 487.1, 488.1, 486.1, 327.2; 252/301.4 R, 301.4 H, 301.4 S, 301.5, 301.18, 301.33, 301.36

[56] References Cited

U.S. PATENT DOCUMENTS

| | | | |
|---|---|---|---|
| 4,049,845 | 9/1977 | Lozier et al. | 428/407 |
| 4,205,234 | 5/1980 | Suzuki et al. | 250/483 |
| 4,225,653 | 9/1980 | Brixner | 428/690 |
| 4,350,893 | 9/1982 | Takahashi et al. | 250/484.1 |
| 4,374,905 | 2/1983 | Rabatin | 428/691 |
| 4,501,796 | 2/1985 | Kitada | 428/691 |
| 4,883,970 | 11/1989 | Page | 428/690 |

Primary Examiner—Paul J. Thibodeau
Assistant Examiner—Hoa T. Le

[57] ABSTRACT

An improved X-ray intensifying screen comprising phosphor crystals having an effective amount of a light scattering particulate material, e.g., barium sulfate, strontium sulfate, calcium sulfate, titanium dioxide or magnesium oxide, adhered thereto is described. This screen will give high speed and yield an image with increased sharpness when exposed with a single-side coated medical X-ray film element, compared to one made without the particulate material.

21 Claims, 2 Drawing Sheets

10 μm

⊢──────⊣
10 μm

⊢──────⊣
10 μm

⊢——⊣
10 μm

X-RAY INTENSIFYING SCREENS WITH IMPROVED SHARPNESS

FIELD OF THE INVENTION

This invention relates to radiographic intensifying screens. More particularly this invention relates to intensifying screens which have higher resolution and are faster and less noisy than conventional intensifying screens.

BACKGROUND OF THE INVENTION

The use of radiographic intensifying screens to reduce the dosage of X-rays in X-ray examinations of a patient (so-called medical radiography), is well-known. These screens will indeed increase the speed of a system many times over. X-ray intensifying screens normally are manufactured by incorporation of a conventional phosphor in a suitable binder and coating this mixture on a support. Since relatively large amounts of a silver halide photographic emulsion are required to form an element used to record an X-ray image, conventionally, the silver halide emulsion is double-side coated on a suitable support. Then, of course, two X-ray screens must be used to generate the image. The use of a combination of two X-ray screens and a double-side coated photographic element results in some unsharpness due to so-called print-through and thus there is an ever-increasing desire by the medical community to increase the inherent sharpness of the system in order to preserve the image quality. With the advent of improved phosphor compositions that can produce more speed, it has been suggested that single-side coated photographic elements be used in an effort to reduce print-through. Naturally, the single-side coated photographic elements are not as fast as double-side coated photographic elements and thus it has been proposed to coat thicker phosphor layers in the screen element to overcome the speed loss. It has been found, however, that if one coats a thicker phosphor layer the resolution of the resulting image decreases and this is unacceptable.

In order to reduce scattered light within an X-ray intensifying screen, it has been found that mixing of pigmented particles within the active phosphor layer will absorb this scattered radiation. With the presence of pigmented particles in the phosphor layer, the speed of the system begins to fall off.

It has now been found that X-ray intensifying screens having higher resolution and which are faster and less noisy than conventional X-ray intensifying screens, when used with a single-side coated photographic element, can be prepared by adhering particular material to the phosphor present in the active layer of the intensifying screens.

BRIEF DESCRIPTION OF THE DRAWINGS

In the accompanying figures forming a material part of this disclosure.

SUMMARY OF THE INVENTION

In accordance with this invention there is provided an X-ray intensifying screen comprising a support having coated thereon an active layer comprising phosphor crystals dispersed in a binder, said phosphor crystals containing small particles of light scattering particulate material adhered thereto, said particles of particulate material being present in an amount of 0.05 to 0.45 weight percent based on the weight of said phosphor.

In accordance with an embodiment of this invention there is provided a process for the preparation of an X-ray intensifying screen comprising (a) dispersing crystals of a calcined phosphor in a washing solution, (b) slurrying the phosphor dispersion with a first reagent and adding a second reagent whereby a precipitate of a light scattering particulate material is precipitated in an amount of about 0.05 to about 0.45 weight percent based on the weight of phosphor, the particulate material adhering to the phosphor, (c) drying the phosphor, (d) mixing the phosphor in an organic polymeric binder, and (e) coating a layer of the phosphor/binder mixture on a support.

Figure 1:
FIG. 1 is an electron micrograph photograph (magnification 3,000) of yttrium tantalate phosphor without the small particles of light scatterer adhered thereto.

Appended FIG. 1 shows an electron photomicrograph of a typical $YTaO_4$ phosphor made according to the teachings of Brixner, U.S. Pat. No. 4,225,653, with no particulate material adhered thereto (Control). The phosphor has the composition $YTa_{0.99}Nb_{0.01}O_4$.

Figure 2:
FIG. 2 is an electron micrograph photograph (magnification 3,000) of a similar phosphor as set out in FIG. 1 but with 0.1% by weight of $BaSO_4$ light scatterer particles adhered thereto.

The electron photomicrograph, FIG. 2, shows the same phosphor composition as in FIG. 1 but having 0.1 weight percent, based on the weight of phosphor present, of $BaSO_4$ particles adhered to the phosphor particles as can be seen. This illustrates the invention.

Figure 3:
FIG. 3 is an electron micrograph photograph (magnification 3,000) of a similar phosphor as set out in FIG. 1 but with 0.5% by weight of $BaSO_4$ light scatterer particles adhered thereto.

The electron photomicrograph, FIG. 3, shows the same phosphor composition as in FIG. 1 but having 0.5 weight percent, based on the weight of phosphor present, of the $BaSO_4$ particles adhered to the phosphor particles. This is a control since the amount is outside the inventive range. It has been found that the desired effects have not been produced.

Any of the conventionally known and recognized X-ray intensifying phosphors may be used to prepare the screens of this invention. Examples of suitable phosphors include: calcium tungstate, barium fluorohalides, yttrium tantalate, lutecium tantalate, and gadolinium oxysulfide, among many others. The phosphors may be suitably activated by the addition of rare earths, for example, niobium, terbium, thulium, etc. Traditionally, the phosphors are manufactured by grinding or milling the various ingredients together followed by firing or calcining at elevated temperatures. A flux, e.g., LiCl, $BaCl_2$, $SrCl_2$, $Li_2SO_4$, $Na_2SO_4$, $K_2SO_4$, etc., or combinations thereof may be present during this firing step. After firing, the material is washed thoroughly, e.g., in an aqueous solution, to remove trace contaminants and any unreacted starting materials and then this washed material is dispersed in a suitable organic polymeric binder, e.g., polyvinyl butyral, acrylic, e.g., Carboset ® acrylic resins, B. F. Goodrich Co., Cleveland, Ohio, etc. before coating on a support. Useful phosphors commonly emit light in the 300-550 nm region of the spectrum when excited by X-ray radiant energy.

In this invention, particulate material is preferably precipitated during the washing step described above. A reagent for forming (precipitating) the particulate material is either already present such as $Li_2SO_4$ or Na$_2$SO$_4$, for example or is dissolved in the dispersing liquid, e.g., water. Pure water is preferably used to rinse the phosphor. The other component, e.g., Ba(NO$_3$)$_2$ dissolved in water, is then added with stirring. Surprisingly, the resulting precipitated particulate material has been found to adhere to the surface of the phosphor/flux mixture as shown in the aforementioned electron photomicrographs. It was not predicted or previously known that these particles, when precipitated, would indeed adhere as can be seen in FIG. 2. By way of illustration, for example, precipitation of particulate material is achieved during the washing step by the slow addition of a Ba(NO$_3$)$_2$ solution to the phosphor dispersed in an aqueous Li$_2$SO$_4$ solution (present from the fluxing step) according to the reaction: Li$_2$SO$_4$ + Ba(NO$_3$)$_2$ → BaSO$_4$ + 2LiNO$_3$. Other methods of adhering the particulate material to the phosphor particles include: milling, e.g., ball- or sand-milling the phosphor with the desired particulate material. These milling methods insure complete mixing of the phosphor with the particulate material and result in firm adherence of the particulate material to the surface of the phosphor. It is also believed that electrostatic charges between the phosphor and particulate material may cause this firm adherence.

There are numerous particulate materials which adhere to the phosphor and produce the desired results. These include: barium sulfate, strontium sulfate, calcium sulfate, titanium dioxide and magnesium oxide, for example. These materials preferably have a high refractive index, e.g., above 1.7, usually reflect more than 90% of the light emitted from the phosphor crystals, and can be present in amounts of about 0.05 to about 0.45 weight percent based on the weight of phosphor present and preferably in the range of about 0.09 to 0.30 weight percent, and most preferably at 0.1 weight percent. Particulate material on the surface of the phosphor should be substantially smaller than the phosphor particle, e.g., about 0.2 to about 2 μm, preferably 0.5 μm or less. The particulate materials may be prepared by the precipitating step described above. Alternatively the light scatterer may be added directly to the binder/phosphor mixture as described in Example 2 below. It is certainly surprising that the particulates of this invention, adhere to the surface of the phosphor crystal as exemplified in the electron photomicrographs and produce the desired advantages.

After preparing the phosphor with the adhered particulate material, the phosphor may be dispersed in any of the known binders therefor set out above using conventional solvents, for example. Conventionally, an X-ray screen comprises a phosphor or active layer coated on a support. A reflective layer containing, for example, TiO$_2$, may be present in the intensifying screen. Commonly, the reflective layer is interposed between the phosphor layer and the support, or, alternatively, the TiO$_2$ may be dispersed directly into the support. The reflective layer increases the light output of the intensifying screen during X-ray exposure. A protective layer is usually applied on top of the phosphor layer in order to protect the phosphor layer against any mechanical damage. In operation, the intensifying screen absorbs X-rays and emits light having a wavelength that is readily captured by the photographic silver halide X-ray film.

The photographic film associated with the intensifying screen of this invention may comprise any of the conventional silver halides, e.g., bromide, chloride, or iodide or mixtures thereof. These silver halide grains may be comprised of any of the conventional shapes such as spherical, octahedral, rhombic, cubic or tabular, for example. A gelatino, silver halide emulsion made using fine monodisperse cubic, silver bromoiodide grains containing 1.5 mole % iodide, wherein the silver bromoiodide grains are brought to their optimum sensitivity with gold and sulfur salts, for example, is particularly preferred. Such an emulsion has good UV-blue sensitivity which may be further enhanced by the presence of a spectral sensitizing dye. The photographic silver halide emulsion is normally coated on a conventional film support such as dimensionally stable, polyethylene terephthalate, although other films can be used. Other adjuvants well-known to those skilled in the art may also be present in the emulsions used to form the silver halide elements useful for exposure with the screens of this invention, e.g., chemical sensitizers, development modifiers, antifoggants and stabilizers, developing agents, hardeners, spectral sensitizers, etc. When the single-side coated, photographic silver halide element is exposed to X-radiation in combination with the aforementioned intensifying screens of this invention, the images produced thereby have excellent speed, good contrast and density at low fog and are sharper and have lower noise than images produced with similar screens which do not have particulate material adhered to the phosphor crystals.

EXAMPLES

This invention is illustrated but not limited by the following examples. The percentages in the examples are by weight. The number average molecular weight of polymers is determined by known osmometry techniques. Weight average molecular weight can be determined by gel permeation chromatography (GPC).

Example 1

This example demonstrates a precipitation process for adhering small particulates to the phosphor crystals. In this example a phosphor of the type described in Brixner U.S. Pat. No. 4,225,653 was prepared. The phosphor composition was YTa$_{0.99}$Nb$_{0.01}$O$_4$ and is shown in the attached FIG. 1. About 500 g of this phosphor, which was snythesized in the presence of a Li$_2$SO$_4$ flux, was dispersed in an aqueous solution of Ba(NO$_3$)$_2$ and the requisite BaSO$_4$ particulate was thus formed in situ. Three phosphor samples were used to demonstrate the efficacy of the invention. To prepare a phosphor having ca. 1% of this particulate material adhered thereto requires 5.6 g of the starting material Ba(NO$_3$)$_2$, 2.80 g for a ca. 0.5% level and 0.56 g for a ca. 0.1% level. Samples were prepared with having no particulate material as shown in FIG. 1, with ca. 0.1% of particulate material as shown in FIG. 2 and with 0.5% of particulate material as shown in FIG. 3. In each sample except the first, the phosphor was slurried with Li$_2$SO$_4$ in the aqueous solution and particulate material was precipitated with Ba(NO$_3$)$_2$ during about 5-10 minutes, filtered, washed and dried. The electron photomicrographs, FIGS. 1 to 3, were taken of the phosphor crystals at this point.

A. A binder solution is prepared by mixing the following ingredients:

| INGREDIENT | AMOUNT (g) |
| --- | --- |
| n-Butyl acetate | 43.13 |

-continued

| INGREDIENT | AMOUNT (g) |
| --- | --- |
| n-Propanol | 34.00 |
| Carboset ®525[1] | 10.00 |
| Carboset ®526[2] | 10.00 |
| Polymeric organic silicone fluid | 0.07 |
| Zelec ®2457E[3] | 0.40 |
| Aerosol ®OT-100[4] | 0.40 |
| Pluronic ®31R1[5] | 2.00 |

[1] Acrylic resin; wt. ave. mol. wt. 260,000; acid no. 76-85; B. F. Goodrich Co., Cleveland, OH
[2] Acrylic resin; wt. ave. mol. wt. 200,000; acid no. 100; B. F. Goodrich Co., Cleveland, OH
[3] Anionic antistatic agent of mixed mono- and dialkyl phosphates of the general structure $R_2HPO_4$, where R is $C_8$ to $C_{10}$ alkyl; E. I. du Pont de Nemours & Co., Wilmington, DE
[4] Sodium dioctyl sulfosuccinate per U.S. Pat. No. 2,441,341
[5] Ethylene oxide/propylene oxide block copolymer; wt. ave. mol. wt. 3,200; BASF Wyandotte; Wyandotte, MI B. 200 g of phosphor and 45 g of the binder solution described in step A above are added to a 250 ml plastic container along with ca. 85 g of 3.8 inch (9.65 cm) dia. corundum balls (ca. 15 balls) and the mixture is ball-milled for 12 to 16 hours at room temperature and with a rotation speed of ca. 60 rpm. Thereafter the ball-milled suspension is filtered through a 75 mesh nylon bag filter and it is then coated onto a 0.010 inch (0.25 mm) polyethylene terephthalate support film containing $TiO_2$ (anatase) in amounts sufficient to make the film opaque to visible light (optical density >1.7). The coating operation is performed with a doctor knife with an adjustable coating gap allowing the final (dry) coating weight of the phosphor coating to be varied from ca. 15 to ca. 110 mg of phosphor per cm² of the coating. The phosphor coating is air dried at 40° C. for 12–16 hours.

C. A solution is prepared by mixing the following ingredients:

| INGREDIENT | AMOUNT (g) |
| --- | --- |
| Acetone | 67.00 |
| Methanol | 9.00 |
| n-Butyl acetate | 4.80 |
| Tyril ®100[1] | 12.70 |
| Carboset ®XL-27[2] | 9.00 |

[1] Styrene/acrylonitrile copolymer resin; Dow Chemical Co., Midland, MI
[2] Acrylic resin no. ave. mol. wt. 30,000; acid no. 80, B. F. Goodrich Co., Cleveland, OH D. A gel solution is prepared by mixing the following ingredients until a thick gel forms:

| INGREDIENT | AMOUNT (g) |
| --- | --- |
| Methanol | 14.70 |
| Triamylamine | 0.20 |
| Carbopol ®1342[1] | 0.132 |

[1] Acrylic resin thickener; B. F. Goodrich Co., Cleveland, OH

E. The solution prepared as described in step C is filtered and a mixture is prepared as follows:

| INGREDIENT | AMOUNT (g) |
| --- | --- |
| Solution C | 50.00 |
| Gel solution D | 12.19 |

F. The mixture described in step E is coated on top of the phosphor coating prepared as described in step B using a doctor knife with a 0.004 inch (0.10 mm) gap. The resulting top-coat is air dried for 12–16 hours at 40° C.

Each intensifying screen was used with a UV-blue-sensitive gelatino silver halide X-ray film. This film was a single-side coating of the emulsion and commonly used for mammography evaluations. The photographic emulsion contains fine monodisperse cubic silver iodobromide crystals containing 1.5 mole % iodide, which have been chemically ripened by the usual methods. Each film/screen combination was given exposures for measuring photographic speed, image resolution and noise using an X-ray source with a molybdenum cathode at 28 KvP. Exposures were made so that the base of the photographic film was closest to the X-ray source and so that the single screen was behind the film, facing the emulsion side of the film. After exposure, the film samples were developed, fixed, washed and dried in conventional manner using a conventional X-ray developer system. Each sample was then evaluated for image quality, speed, noise and resolution. With samples containing 0.1 and 0.5% of the particulate material adhered to the phosphor and having the same phosphor coating weight as the control, which contains no particulate material adhered to the phosphor, the resolution was significantly higher than that of the control, while the speed and the noise were somewhat lower. IF the phosphor coating weight of the coatings containing 0.1% of particulate material adhered to the phosphor was increased so that the speed of second screen coating was equal to that of of the aforementioned lower coating weight control, then the resulting image still had a higher resolution than the aforementioned control and the resulting image noise was significantly lower that of the control. With 0.5% of the particulate material adhered to the phosphor it was not possible to raise the phosphor coating weight sufficiently to achieve the same speed as the aforementioned control.

Example 2

In this example, a phosphor comprising $Lu_{0.95}Sr_{0.05}Ta_{0.99}Nb_{0.01}O_{3.975}$ and a phosphor comprising $Lu_{1.0}Ta_{0.99}Nb_{0.01}O_{3.975}$ were prepared following the teachings Brixner U.S. Pat. No. 4,225,653. 200 g of phosphor and 45 g of the same binder solution as that described in Example 1 was added to a 1000 ml container. 200 g of 0.1 mm glass beads were then added to the container and the mixture was sand-milled at 1200 rpm for 15 minutes. Thereafter the milling process was interrupted and $Ba(SO_4)_2$ was added to the dispersion (0.2 g for particulate concentration of 0.1% and 1.0 g for a particulate concentration of 0.5%). Sand-milling was then continued for 45 minutes. Thereafter the dispersion was coated as described in Example 1.

After making intensifying screens from each phosphor, the samples were exposed with the photographic film, developed, fixed, washed and dried all as described in Example 1. For control purposes, phosphor that had not been sand-milled with the particulate material was also made into an intensifying screen in a like manner. The results of this example were similar to those described in Example 1.

We claim:

1. An X-ray intensifying screen comprising a support having coated thereon an active layer comprising phosphor crystals dispersed in a binder, said phosphor crystals containing small particles of light scattering particulate material adhered thereto, said particles of particulate material being present in an amount of 0.05 to 0.45 weight percent based on the weight of said phosphor.

2. An X-ray intensifying screen according to claim 1 wherein said particles of particulate material are present in a range of 0.09 to 0.3 weight percent.

3. An X-ray intensifying screen according to claim 1 wherein said particles of particulate material are deposited on and adhered to said phosphor by precipitation.

4. An X-ray intensifying screen according to claim 1 wherein said particles of particulate material are deposited on and adhered to said phosphor by milling therewith.

5. An X-ray intensifying screen according to claim 1 wherein said phosphor crystals emit light in the wavelength region of 300–550 nm when activated by X-ray radiant energy and said particles of particulate material reflect more than 90% of said light.

6. An X-ray intensifying screen according to claim 2 wherein said phosphor crystals emit light in the wavelength region of 300–550 nm when activated by X-ray radiant energy and said particles of particulate material reflect more than 90% of said light.

7. An X-ray intensifying screen according to claim 1 wherein said particles are selected from the group consisting barium sulfate, strontium sulfate calcium sulfate, titanium dioxide and magnesium oxide.

8. An X-ray intensifying screen combination comprising a screen according to claim 1 and adjacent to the screen a single-side coated, blue-sensitive, gelatino silver halide film, wherein said combination will produce a high quality image when exposed to X-radiation.

9. A process for the preparation of an X-ray intensifying screen comprising (a) dispersing crystals of a calcined phosphor in a washing solution, (b) slurrying the phosphor dispersion with a first reagent and adding a second reagent whereby a precipitate of a light scattering particulate material is precipitated in an amount of about 0.05 to about 0.45 weight percent based on the weight of phosphor, the particulate material adhering to the phosphor, (c) drying the phosphor, (d) mixing the phosphor in an organic polymeric binder, and (e) coating a layer of the phosphor/binder mixture on a support.

10. A process according to claim 9 wherein the phosphor is selected from the group consisting of calcium tungstate, barium fluorohalides, yttrium tantalate, lutecium tantalate and gadolinium oxysulfide.

11. A process according to claim 10 wherein the phosphor is $YTa_{0.99}Nb_{0.01}O_4$.

12. A process according to claim 9 wherein the washing solution is an aqueous solution.

13. A process according to claim 9 wherein the first reagent is $Li_2SO_4$ and the second reagent is $Ba(NO_3)_2$.

14. A process according to claim 9 wherein the first reagent is $Li_2SO_4$ and the second reagent is $Ca(NO_3)_2$.

15. A process according to claim 9 wherein the first reagent is $Na_2SO_4$ and the second reagent is $Sr(NO_3)_2$.

16. A process according to claim 9 wherein the first reagent is $K_2SO_4$ and the second reagent is $Ba(NO_3)_2$.

17. A process according to claim 9 wherein the particulate material adhering to the phosphor is selected from the group consisting of barium sulfate, strontium sulfate, and calcium sulfate.

18. A process according to claim 17 wherein the particulate material is barium sulfate.

19. A process according to claim 9 wherein the particulate material is precipitated in an amount of 0.09 to 0.3 weight percent.

20. A process according to claim 10 wherein the particulate material is precipitated in an amount of 0.09 to 0.3 weight percent.

21. A process according to claim 9 wherein a protective layer is applied to the phosphor binder layer.

* * * * *